United States Patent [19]

Yasukawa

[11] Patent Number: 5,652,929
[45] Date of Patent: Jul. 29, 1997

[54] CAMERA HAVING A THROUGH-THE-LENS AUTOMATIC LIGHT ADJUSTMENT CONTROL DEVICE

[75] Inventor: Seiichi Yasukawa, Yotsukaido, Japan

[73] Assignee: Nikon Corporation, Tokyo, Japan

[21] Appl. No.: 522,663

[22] Filed: Sep. 1, 1995

[30] Foreign Application Priority Data

Nov. 1, 1994 [JP] Japan .................................. 6-268672

[51] Int. Cl.$^6$ .................................................. G03B 7/00
[52] U.S. Cl. .................................................. 396/157
[58] Field of Search .................. 354/415; 396/157, 396/158

[56] References Cited

U.S. PATENT DOCUMENTS

| | | | |
|---|---|---|---|
| 4,657,367 | 4/1987 | Kataoka | 354/415 |
| 4,994,845 | 2/1991 | Naruse et al. | 354/415 |
| 4,998,128 | 3/1991 | Coltman et al. | 354/415 |
| 5,164,759 | 11/1992 | Yasukawa | 354/415 |
| 5,168,300 | 12/1992 | Yasukawa | 354/415 |
| 5,221,941 | 6/1993 | Matsui et al. | 354/415 |
| 5,227,836 | 7/1993 | Yasukawa et al. | 354/415 |
| 5,268,730 | 12/1993 | Takagi | 354/415 |
| 5,309,193 | 5/1994 | Takagi | 354/415 |
| 5,371,568 | 12/1994 | Takagi et al. | 354/415 |
| 5,422,702 | 6/1995 | Yasukawa | 354/415 |

*Primary Examiner*—Safet Metjahic
*Assistant Examiner*—Michael Dalakis

[57] ABSTRACT

A low cost, compact multi-light through-the-lens adjustment unit for use in a camera which incorporates a built-in flash allowing an increase in the speed of a shutter release operation of the camera. A charged voltage of a charge accumulation unit is measured prior to a light pre-emission. The light pre-emission is initiated and thereafter terminated based on a quantity of reflected light detected. The time difference between the initiation of the light pre-emission and the termination of the light pre-emission is measured by a time difference measurement unit. The amount of light pre-emission light of the light emission unit is calculated based on the measured charged voltage and the time difference measurement. Alternatively, the charged voltage prior to light pre-emission is measured by a first voltage measurement unit and the charging voltage after light pre-emission is measured by a second voltage measurement unit. The amount of light pre-emission is calculated based on the difference between charged voltage prior to the light pre-emission and charging voltage after the light pre-emission.

14 Claims, 11 Drawing Sheets

CAMERA HAVING A THROUGH-THE-LENS AUTOMATIC LIGHT ADJUSTMENT CONTROL DEVICE

BACKGROUND OF THE INVENTION

1. Field of the Invention

The present invention relates to a through-the-lens ("TTL") automatic light adjustment control device for a camera which pre-emits a light prior to a main light emission during exposure and, in particular, a TTL automatic light adjustment control device which controls an amount of light emission of a main light emission, during exposure, based on information regarding a reflected light distribution of a subject field detected during a pre-emission of light.

2. Description of the Related Art

So-called TTL automatic light adjustment photography executes control during flash photography. A flash emission is begun immediately after a shutter of a camera opens. Light reflected from the subject arrives at a film surface, through a photographic lens. Light reflected by the film surface is captured by a photoelectric conversion unit within a mirror box of the camera and is converted to electric signals, at a specified amplification rate determined by the film sensitivity. The electric signals are then integrated with a condenser. The output of the condenser is compared with a specified value, and the flash emission is terminated at the point in time when the output of the condenser equals the specified value.

"TTL multi-light adjustment" technology, which is a type of TTL automatic light adjustment control system has evolved in recent years. Such technology is disclosed in Japanese Laid-Open Patent Publication Number Hei 3-68928. Multiple photoelectric conversion units, capable of measuring light by dividing a subject field into multiple areas, are arranged in a position to watch a film plane. A flash is pre-emitted, prior to opening a focal plane shutter. The light reflected by the subject image on the shutter curtain surface is captured by the multiple photoelectric conversion unit. Each output of the multiple photoelectric conversion units is individually integrated generating subject field reflected light distribution information for each region based on the light pre-emission. To obtain an optimum exposure for the main subject, the weighing of each separate region is based on a specified algorithm for processing the subject field reflected light distribution information, as detected for each region.

A main flash is thereafter emitted immediately after the shutter has opened. Light reflected by the film plane is captured by the same multiple photoelectric conversion unit. The output of the photoelectric conversion unit is given predetermined weights and integrated. The main flash emission is terminated when the integrated output matches a specified value.

The light pre-emission in Japanese Laid-Open Patent Publication Number Hei 3-68928 is for detecting, in advance, information on the subject field reflected light distribution. Further, a judgement is made as to whether each separate field measured should be emphasized during the main light emission. It is therefore necessary for the control device to determine the amount of flash emission (amount of light pre-emission) that is illuminated as the light pre-emission. A repeated light emission system has been proposed for this purpose.

In the proposed repeated light emission system, when a light pre-emission command signal is input, a single small light pre-emission, with a known amount of light, is executed. A camera control device repeatedly outputs the light pre-emission command signal, and stops the light pre-emission command when the integrated output of each separate region has reached a predetermined level. The camera control device counts the number of times the light pre-emission command is given, and derives the amount of total light emission of the light pre-emission from the count and the known amount of light pre-emission per light emission.

Nonetheless, when using this proposed repeated light emission system, the control circuit for repeatedly conducting the small light quantity light pre-emission is rather complicated. The space and cost added by this control circuit, inhibits the designing and making of a compact, low cost camera. In particular, when designing a camera body that incorporates a flash, this problem is presumably insurmountable. In a camera which incorporates a flash, it has heretofore not been possible to mount a TTL multi-light adjustment unit. Moreover, with a light pre-emission that is based on a repeated light emission system, because the number of light emissions may become large, depending on the subject field conditions, and because each emission cannot be shorter than a given specified time, due to circuit limitations, the light pre-emission can take a long time, for example, about 3 ms. Thus, the time from when the mirror has been brought up until releasing the front blind of the shutter is increased and the camera release operation cannot be conducted at high speed.

SUMMARY OF THE INVENTION

Accordingly, it is an object of the present invention to provide a TTL automatic light adjustment control device that provides a low cost, compact multi-light adjustment function that increases the speed of a shutter release operation of a camera.

It is a further object of the present invention to provide a TTL automatic light adjustment control device in which an amount of light pre-emission is calculated based on a charging voltage prior to light pre-emission and a time from the beginning to the end of the light pre-emission.

It is an additional object of the present invention to provide a TTL automatic light adjustment control device in which an amount of light pre-emission is calculated based on the difference between a charging voltage prior to the light pre-emission and the charging voltage after the light pre-emission.

It is a yet further object of the present invention to provide a TTL automatic light adjustment control device in which a subject field reflected light is measured and integrated and when the integrated result of the measured light reaches a specified standard value, a light pre-emission termination signal is output.

It is another object of the present invention to provide a TTL automatic light adjustment control device in which a first signal is sent when an integrated amount of measured pre-emission light reaches a specified standard value, a second signal is sent when a specified time has been measured after a light pre-emission initiation signal has been sent, and the light pre-emission termination signal is sent at the point in time when one of the first signal and the second signal is sent.

Additional objects and advantages of the invention will be set forth in part in the description which follows, and, in part, will be obvious from the description, or may be learned by practice of the invention.

Objects of the present invention are achieved in a TTL automatic light adjustment control device which conducts a light pre-emission prior to exposure of a film, and controls an amount of light emission of a main light emission during exposure based on information about the reflected light distribution of the subject field. The control device comprises a voltage increase unit to boost or increase the power source voltage, a charge accumulation unit, charged by the voltage boosted by the voltage increase unit, which accumulates an electric charge, a light emission unit that emits a flash by discharging the charge accumulated by the charge accumulation unit, a voltage measurement unit that measures the charging voltage of charge accumulation unit prior to the light pre-emission, a light pre-emission initiation control unit which gives the light emission unit a light pre-emission initiation signal, a light pre-emission termination control unit which gives the light emission unit a light pre-emission termination signal, a time difference measurement unit which measures the time difference between the light pre-emission initiation signal and the light pre-emission termination signal, and an amount of light pre-emission calculation unit which calculates the amount of the light pre-emission of the light emission unit based on the charging voltage measured by the voltage measurement unit and the time difference measured by time difference measurement unit.

Objects of the present invention are also achieved in a TTL automatic light adjustment control device which conducts a light pre-emission prior to exposing a film, and controls an amount of light emission of the main light emission during the exposure based on information detected regarding the reflected light distribution of the subject field, the TTL automatic adjustment control device comprising a voltage increase unit to boost a power source voltage, a charge accumulation unit charged by the voltage boosted by the voltage increase unit, so as to accumulate an electric charge, a light emission unit that emits a flash by discharging the charge accumulated by the charge accumulation unit, a first voltage measurement unit that measures the charging voltage of charge accumulation unit prior to the light pre-emission, a light pre-emission initiation control unit which gives the light emission unit a light pre-emission initiation signal, a light pre-emission termination control unit which gives the light emission unit a pre-emission termination signal, a second voltage measurement unit that measures the charging voltage of the charge accumulation unit after the light pre-emission, and an amount of light pre-emission calculation unit which calculates the amount of light pre-emission of light emission unit based on the difference between the charging voltage measured by first voltage measurement unit and the charging voltage measured by second voltage measurement unit.

Objects of the present invention are further achieved in a TTL automatic light adjustment control device which configures a light pre-emission termination control unit to output a light pre-emission termination signal when a result of integrating a reflected light of a subject reaches a specified standard value.

Objects of the present invention are also achieved in a TTL automatic light adjustment control device which configures a light pre-emission termination control unit to send a first signal when reflected light of a subject field is measured and integrated and reaches a specified standard value, a unit which sends out a second signal when a specified time has been measured after a light pre-emission initiation signal has been sent, and a unit which outputs a light pre-emission termination signal at a point in time when one of the first signal and the second signal is sent.

Objects of the present invention are also achieved by a through-the-lens automatic light adjustment control device comprising a voltage increase unit to increase a power source voltage, a charge accumulation unit charged by the voltage increase unit so as to accumulate an electric charge, a light emission unit that emits a light pre-emission by discharging the charge accumulated by the charge accumulation unit, a voltage measurement unit that measures the charged voltage of the charge accumulation unit prior to the light pre-emission, a light pre-emission initiation control unit which sends the light emission unit a light pre-emission initiation signal to begin the light pre-emission, a light pre-emission termination control unit which sends the light emission unit a light pre-emission termination signal to terminate the light pre-emission, a time difference measurement unit which measures the time between the light pre-emission initiation signal and the light pre-emission termination signal, and an amount of light pre-emission determination unit which calculates the amount of light pre-emission based on the charged voltage measured by the voltage measurement unit and the time measured by the time difference measurement unit.

Objects of the present invention are further achieved by a through-the-lens automatic light adjustment control device comprising a voltage increase unit to increase a power source voltage, a charge accumulation unit charged by the voltage increase unit so as to accumulate an electric charge, a light emission unit that emits light pre-emission by discharging the charge accumulated by the charge accumulation unit, a first voltage measurement unit that measures the voltage of the charge accumulation unit prior to the light pre-emission, a light pre-emission initiation control unit which sends the light emission unit a light pre-emission initiation signal to begin the light pre-emission, a light pre-emission termination control unit which sends the light emission unit a light pre-emission termination signal to terminate the light pre-emission, a second voltage measurement unit that measures the voltage of the charge accumulation unit after the light pre-emission, and an amount of light pre-emission determination unit which calculates the amount of light pre-emission based on the difference between the voltage measured by the first voltage measurement unit and the voltage by the second voltage measurement unit.

Objects of the present invention are also achieved by a camera comprising a main optical lens to focus light fluxes on a focal plane, a flash unit to emit light, a shutter extending across the focal plane, a photoelectric conversion unit adapted to receive light fluxes reflected by the shutter and output a signal indicative of the amount of light received, a charge accumulation unit to accumulate an electrical charge to provide to the flash unit, a pre-emission initiation control unit to send a pre-emission initiation signal to the flash unit to initiate a light pre-emission, a termination control unit to send a pre-emission termination signal to the flash unit to terminate the light pre-emission, and a calculation unit to calculate an amount of light emitted by the light pre-emission based on a voltage of the charge accumulation unit prior to the light pre-emission and a time between the pre-emission initiation signal and the pre-emission termination signal.

Objects of the present invention are further achieved by a camera comprising a main optical lens to focus light fluxes on a focal plane, a flash unit to emit light, a shutter extending across the focal plane, a photoelectric conversion unit adapted to receive light fluxes reflected by the shutter and output a signal indicative of the amount of light received, a charge accumulation unit to accumulate an electrical charge to provide to the flash unit, a pre-emission initiation control unit to send a pre-emission initiation signal to the flash unit to initiate a light pre-emission, a termination control unit to send a pre-emission termination signal to the flash unit to terminate the light pre-emission, and a calculation unit to calculate an amount of light emitted by the light pre-emission based on a voltage of the charge accumulation unit prior to the light pre-emission and a voltage of the charge accumulation unit after the light pre-emission.

Objects of the present invention are also achieved by a method of performing light adjustment control for a flash comprising initiating a pre-emission flash, measuring a voltage of a charge accumulation unit used to emit the pre-emission flash prior to the initiation of the pre-emission flash, terminating the pre-emission flash when a quantity of detected reflected light reaches a preset value, measuring a time between initiating and terminating the pre-emission flash, and calculating the amount of light emitted by the pre-emission flash based on the measured voltage and time.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 7b is a continuation of the timing chart of FIG. 7a.

DESCRIPTION OF THE PREFERRED EMBODIMENTS

Figure 1A:
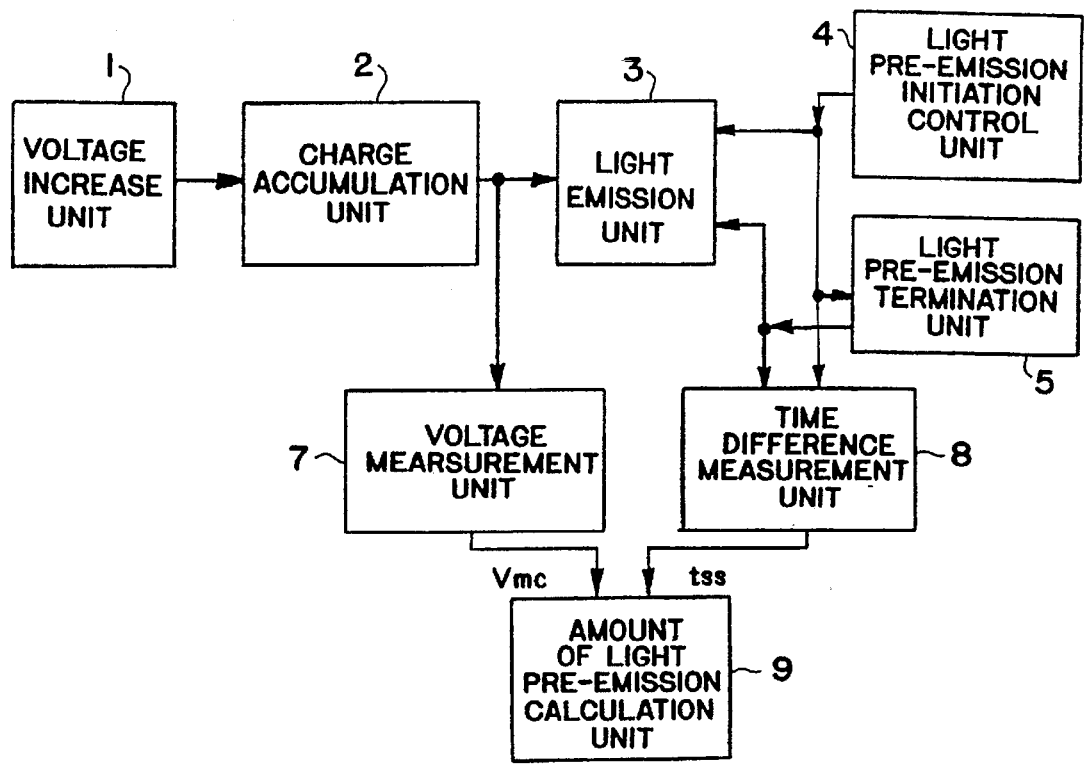
FIG. 1a is a diagram of a TTL automatic light adjustment control device in accordance with a first preferred embodiment of the present invention.

Reference will now be made in detail to the present preferred embodiments of the present invention, examples of which are illustrated in the accompanying drawings, wherein like reference numerals refer to like elements throughout.

FIG. 1a is a diagram of a through-the-lens ("TTL") automatic light adjustment control device particularly suitable for a camera in accordance with the first preferred embodiment of the present invention. A voltage increase unit 1 boosts a power source voltage and charges a charge accumulation unit 2. A light emission unit 3 emits a flash by discharging the charge accumulated by the charge accumulation unit 2. A voltage measurement unit 7 measures the charging voltage of the charge accumulation unit 2 prior to the pre-emission light. A light pre-emission initiation control unit 4 provides a light pre-emission initiation signal to the light emission unit 3 to initiate light pre-emission. A light pre-emission termination control unit 5 provides a light pre-emission termination signal to terminate the light pre-emission to the light emission unit 3. A time difference measurement unit 8 measures the time difference between the light pre-emission initiation signal and the light pre-emission termination signal. An amount of light pre-emission calculation unit 9 calculates the amount of light pre-emission from the light pre-emission unit 3 based on a charging voltage measured by the voltage measurement unit 7 and the time difference measured by the time difference measurement unit 8.

Figure 1B:
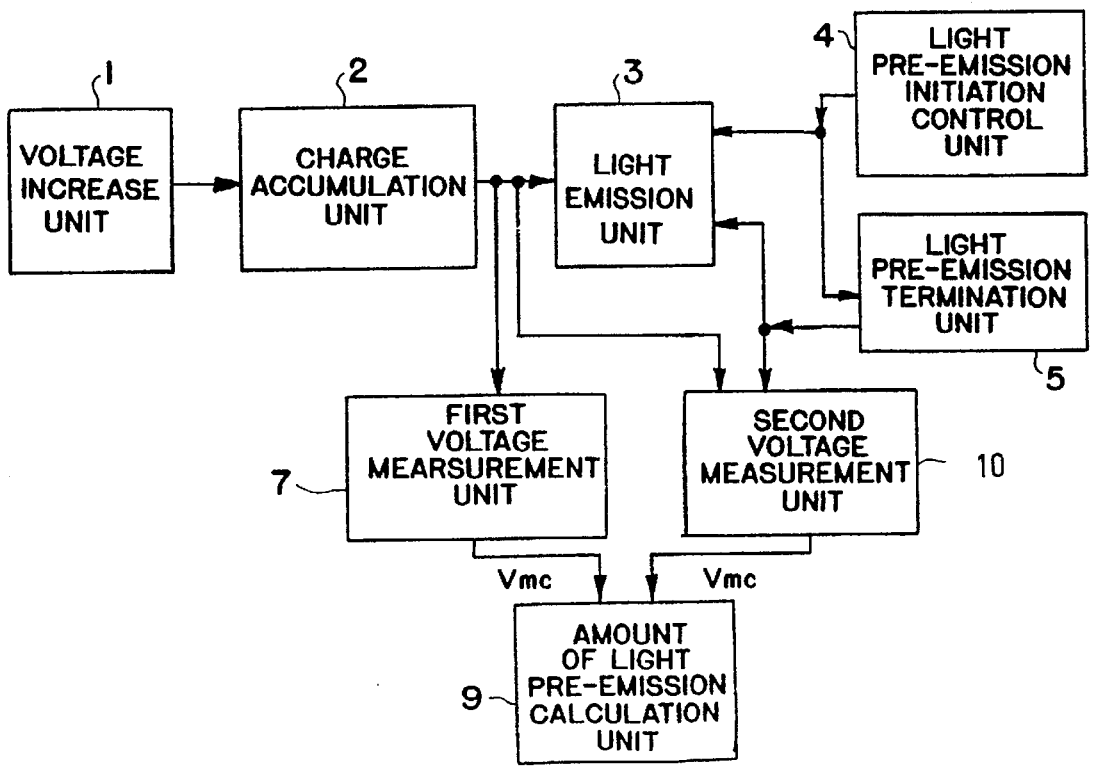
FIG. 1b is a diagram of a TTL automatic light adjustment control device in accordance with a second preferred embodiment of the present invention.

FIG. 1b is a diagram of a TTL automatic light adjustment control device in accordance with a second preferred embodiment of the present invention. The TTL automatic light adjustment control device, in accordance with a second preferred embodiment, does not have a time difference measurement unit 8, as set forth in the first preferred embodiment of the present invention. Instead, a second voltage measurement unit 10 is provided to measure the charging voltage of the charge accumulation unit 2 after a light pre-emission. Thereafter, the amount of light pre-emission calculation unit 9 calculates an amount of light pre-emission, to be output by the light emission unit 3, based on the difference between the charging voltage measured by the first voltage measurement unit 7 and the charging voltage measured by the second voltage measurement unit 10.

Figure 2:
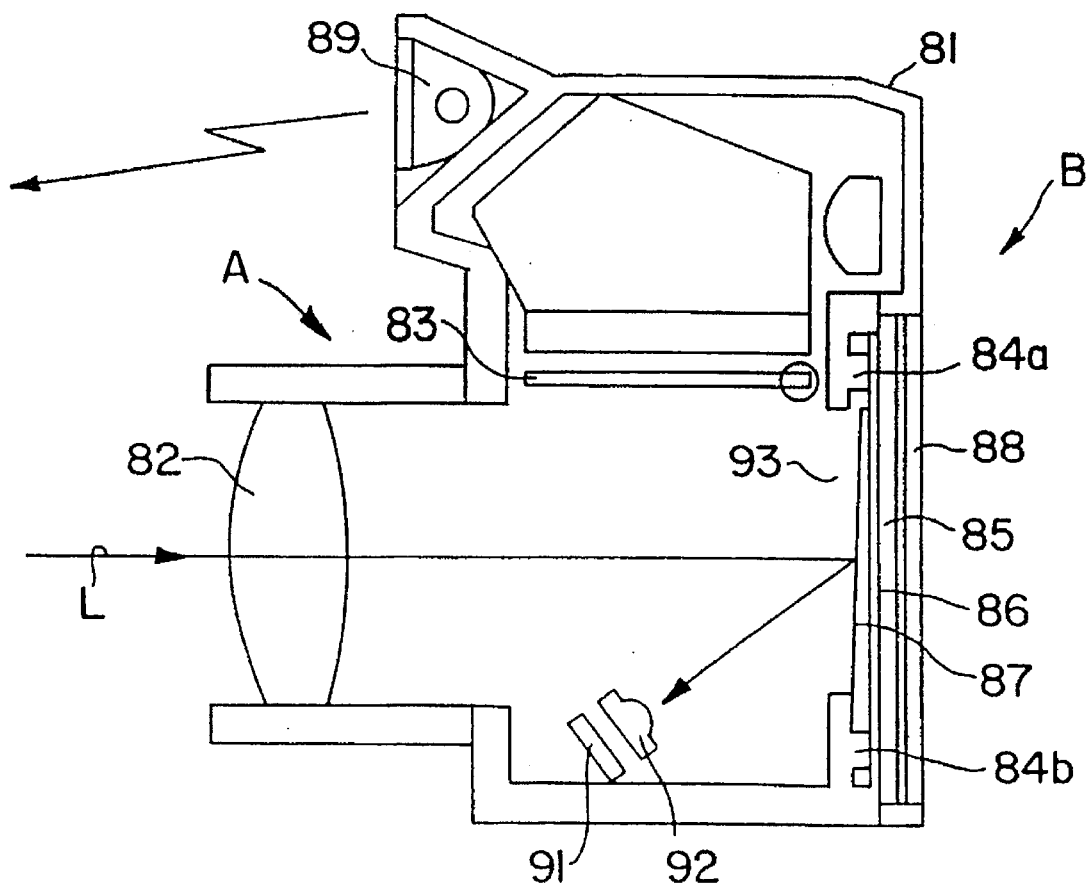
FIG. 2 is a diagram of a camera having a TTL automatic light adjustment control device in accordance with the preferred embodiments of the present invention.

FIG. 2 is a diagram of a camera having a TTL automatic light adjustment control device in accordance with the preferred embodiments of the present invention. The camera generally comprises a main camera body 81, a photographic lens 82, a moveable mirror 83, internal rails 84a and 84b, a pressure plate 85, film 86, a front blind 87 of a focal pre-shutter, a rear cover 88, a built-in flash 89 provided on the main camera body 81, an optoelectric conversion unit 91, a condenser lens 92, and an aperture region 93.

In FIG. 2, the moveable mirror 83 has been retracted. The film 86 is fixed by the internal rails 84a and 84b and the pressure plate 85 in a location at which light fluxes, passed through the photographic lens 82, are focused. The front shutter blind 87 is directly in front of the film 86 and shades the light so that exposure of film 86 is not permitted except during photography. During exposure, specifically, when the front shutter blind 87 is retracted, light fluxes L from the subject, defracted by the photographic lens 82, are focused on the surface of film 86. Some light fluxes L are reflected to the condenser lens 92 and the optoelectric conversion unit 91. At other times, specifically, when front shutter blind 87 is in the position shown in FIG. 2, light fluxes L from the subject, defracted by photographic lens 82, are nearly in focus on the surface of front shutter blind 87. Some of the light fluxes L are reflected to the condenser lens 92 and the optoelectric conversion unit 91.

Figure 3:
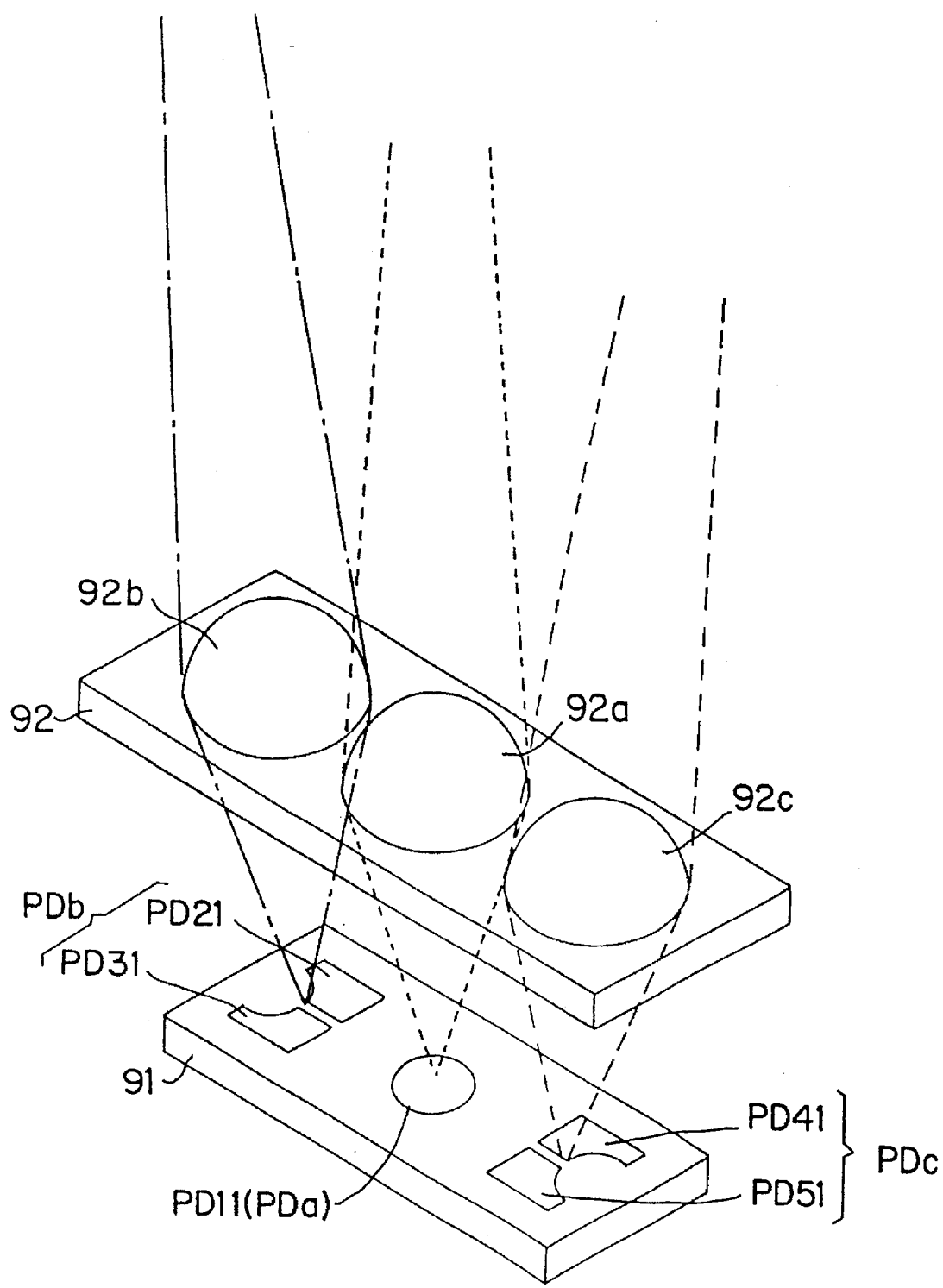
FIG. 3 is a diagram of an optoelectric conversion unit and a condenser lens of a TTL automatic light adjustment control device in accordance with the preferred embodiments of the present invention.

FIG. 3 is a diagram of the optoelectric conversion unit 91 and the condenser lens 92. The optoelectric conversion unit 91 provides a circular light receiving region PD11 (comprising block PDa). Light receiving regions PD21, PD31 (comprising block PDb), PD41, and PD51 (comprising block PDc) have rectangular shapes in which arcs have been cut out. The light receiving regions PD11–PD51 are arranged on the same plane. The condenser lens 92 has three lens parts 92a, 92b and 92c corresponding to the three blocks PDa, PDb, PDc of the light receiving regions of the optoelectric conversion unit 91.

Figure 4:
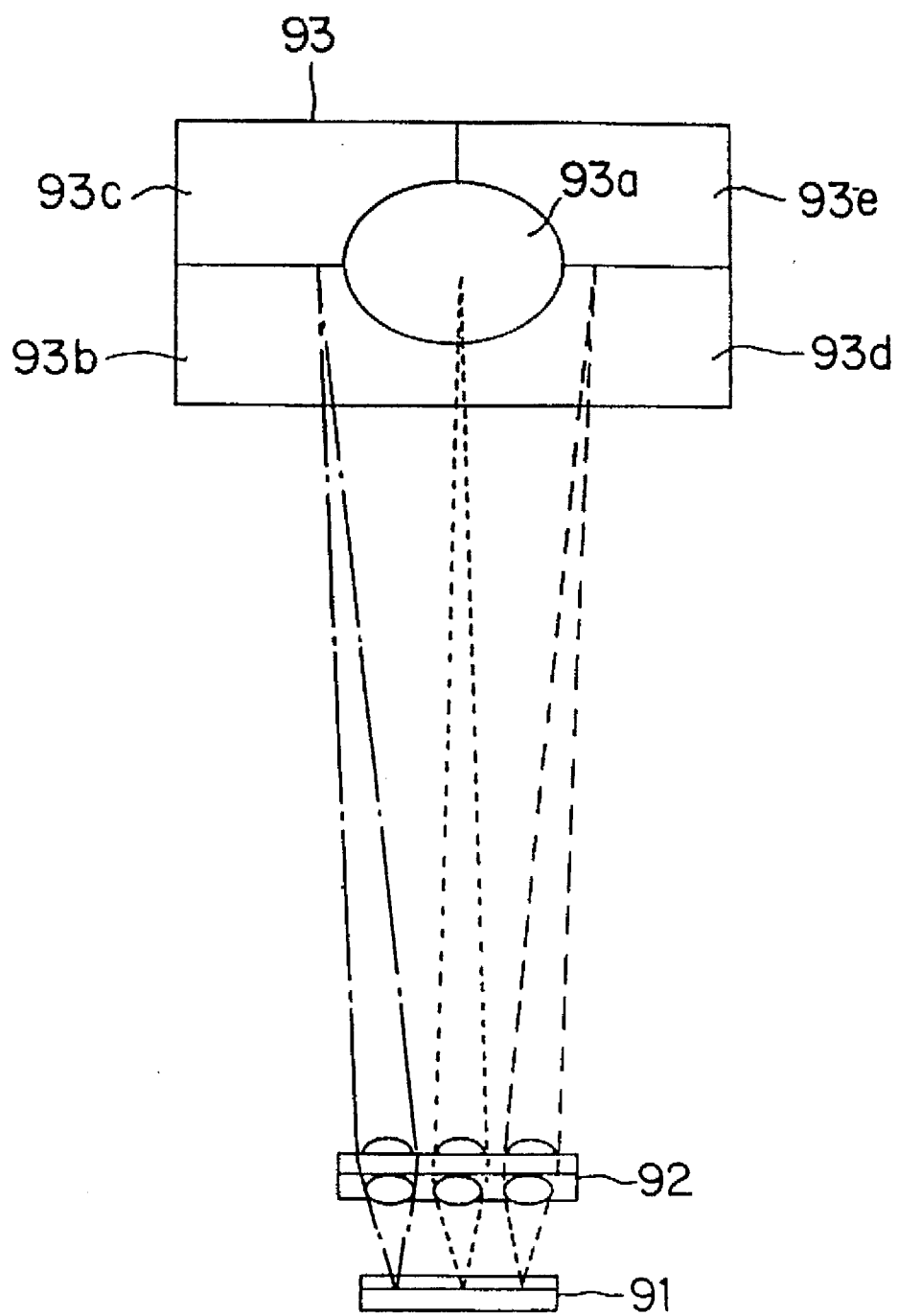
FIG. 4 is a diagram of the optical positional relationships of an aperture region of a film plane, an optoelectric conversion unit and a condenser lens when viewed from A in FIG. 2.

FIG. 4 is a diagram of the optical positional relationship of the aperture region 93 of the film plane, with the optoelectric conversion unit 91 and the condenser lens 92 as viewed from A in FIG. 2. The aperture region 93 is divided into the five regions, specifically, a central circular part 93a and rectangular parts 93b, 93c, 93d and 93e. The three blocks PDa, PDb and PDc (see FIG. 3) which correspond to the center, left and right of the optoelectric conversion unit 91, look onto the center, left half and right half respectively of aperture region 93 through the three lens parts 92a, 92b and 92c (see FIG. 3) of condenser lens 92 as indicated by the fine dotted lines, the chained lines, and the coarse dotted lines, respectively. In addition, because the five light receiving regions PD11, PD21, PD31, PD41 and PD51 of the optoelectric conversion unit 91 agree respectively with the shapes of regions 93a, 93b, 93c, 93d, and 93e of aperture region, the optoelectric conversion unit 91 measures light by separating the brightness of the five regions.

Figure 5:
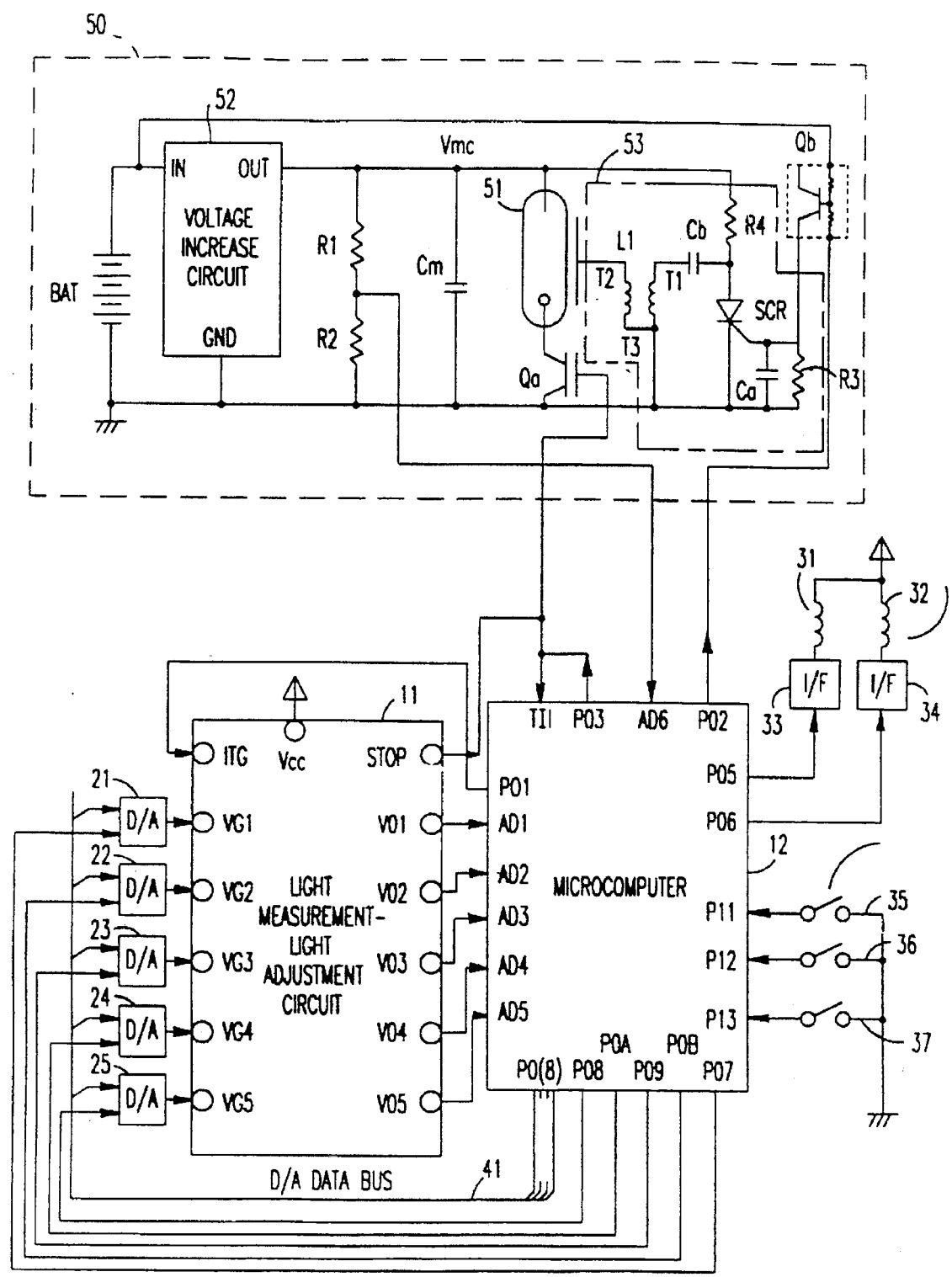
FIG. 5 is a circuit diagram of a circuit provided in the camera shown in FIG. 2.

FIG. 5 is a block diagram of a circuit provided in the camera shown in FIG. 2. The circuit generally comprises a light measurement-light adjustment circuit 11, a microcomputer 12, and an incorporated flash circuit part 50.

Figure 6:
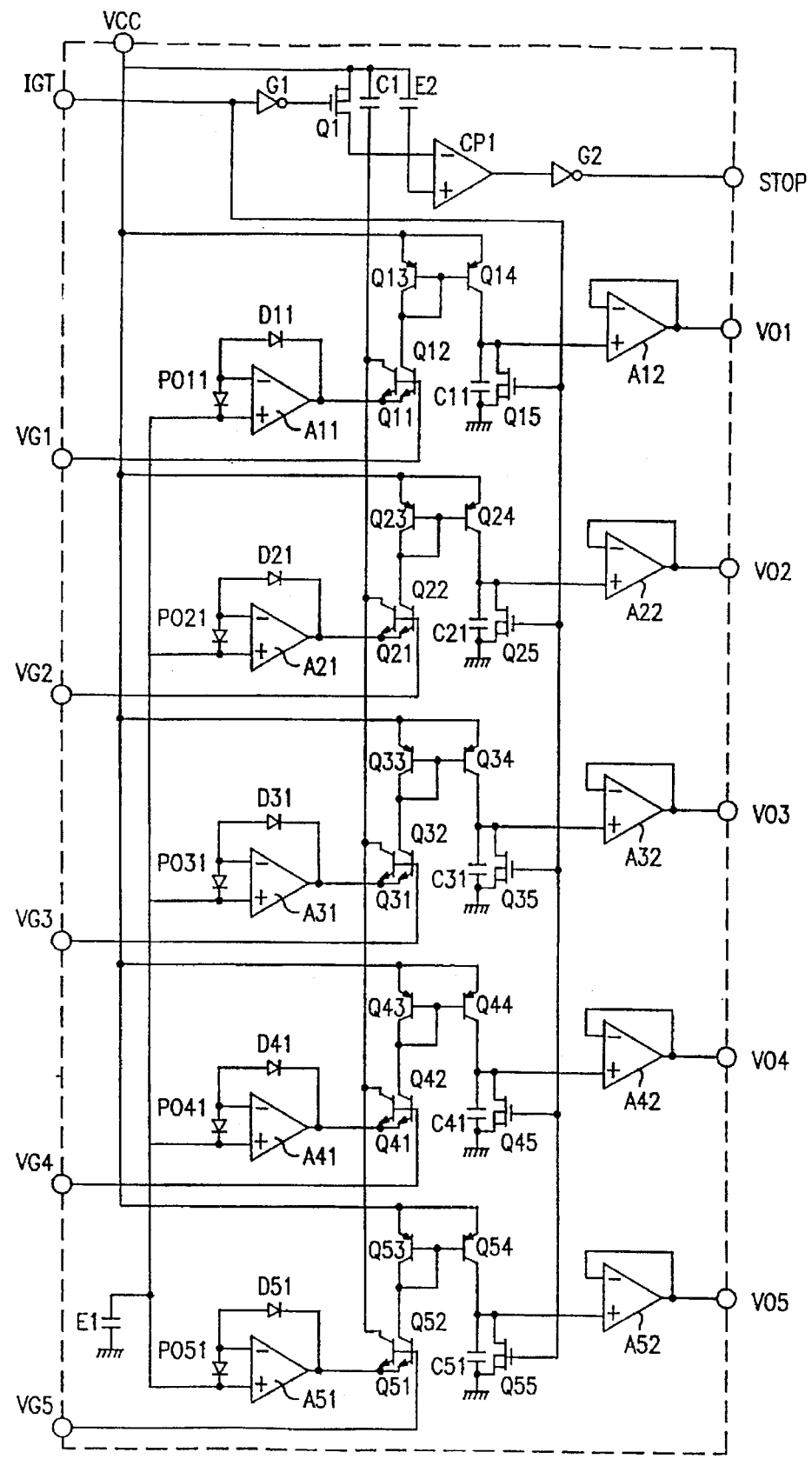
FIG. 6 is a circuit diagram of a light measurement-light adjustment circuit of the circuit shown in FIG. 5.

FIG. 6 is a circuit diagram of the light measurement-light adjustment circuit 11 shown in FIG. 5. Preferably, photodiodes are used as the light receiving regions of the optoelectric conversion unit, i.e., PD11, PD21, PD31, PD41, and PD51 (see FIG. 3). Photodiodes PO11–PO51 output optoelectric current proportional to the illuminance of each. For example, the optoelectric current output by the photodiode PO11 is converted to a voltage output that has been logarithmically compressed by an OP-amp A11 using the feedback of a diode D-11 using standard power source E1 as the standard. Transistors Q11 and Q12 take this voltage as the electric potential of the emitter, take an input voltage from a gain setting input terminal VG1 as the electric potential of the base, and output a collector current which is logarithmically expanded by the gain determined by a difference of electric potential.

The collector current of transistor Q12 is inverted by a current mirror circuit comprising transistors Q13 and Q14 which are connected to Vcc (see FIG. 5); The inverted current charges a condenser C11. The voltage which charges the condenser C11 is output to an integration voltage output terminal V01 through a follower amp A12. A FET-Q15 receives a signal from an integration control signal input terminal ITG, and discharges the entire electric charge accumulated at the condenser C11. These operations are the same in relation to the other four light measurement circuits (channels) which have V02–V05 as the integrated voltage output terminals; OP-amps 21, 31, 41 and 51; and condensers C21, C31, C41 and C51.

The collector currents of transistors Q11–Q51 are added and used to charge a condenser C1. The voltage charged at the condenser C1 is compared to a standard voltage E2 by a comparator CP1. When the relationship between the voltages is inverted, by an inverter G2 the output of the comparator CP1 inverts from a "L" level to a "H" level, and an output terminal STOP turns from an "H" level to an "L". The FET-Q1 receives the signal from the integration control signal input terminal ITG, inverted by an inverter G1, and discharges all the electric charge accumulated at condenser C1.

Referring once again to FIG. 5, data is output to D/A (Digital/Analog) converters 21–25 through a data bus 41 from an 8 bit output port PO(8) by the microcomputer 12. Consequently, the microcomputer 12 independently sets voltages to each D/A converter 21–25 by selected signals that are output from the five terminals of output ports PO7, PO8, PO9, P0A and POB. The output voltages of the D/A converters 21–25 are input respectively to the gain setting input terminals VG1–VG5 of the light measurement-light adjustment circuit 11. The five integrated voltage output terminals VO1–VO5 of light measurement-light adjustment circuit 11 are connected to A/D conversion input terminals AD1–AD5 of the microcomputer 12. The output port PO1 of microcomputer 12 is connected to the integration control signal input terminal ITG. An output terminal STOP of light measurement-light adjustment circuit 11 is connected in parallel to a time measurement input port TI1 of the microcomputer 12 and a gain terminal of IGBT-Qa of the incorporated flash circuit part 50. Also, the time measurement input port TI1 is connected to an output port PO3.

A pair of mechanical switches 35 and 36 are used to operate the camera drive sequence. The switch 35 is a mirror up switch which goes on when the mirror has been brought up. The switch 36 is a synchro switch which goes on when the shutter is fully opened. A release activation switch 37 is turned on when the photographer presses the shutter release button. Signals from the three switches 35–37 are connected respectively to the microcomputer 12 input ports P11–P13, with pull up resistance. A pair of magnets 31 and 32 anchor the front shutter blind and the rear shutter blind, respectively. Signals from output ports PO5 and PO6 of the microcomputer 12 control through interfaces 33 and 34, respectively.

The incorporated flash circuit part 50 generally comprises a battery BAT, a flash discharge tube 51, a voltage increase circuit 52, a main condenser Cm, an IGBT-Qa, a resistance input transistor Qb, resistors R1 and R2, and a light emission activation circuit 53 including resistors R3 and R4, condensers Ca and Cb, a silicon controlled rectifier SCR, and a transformer L1 with terminals T1, T2 and T3.

In the voltage increase circuit 52, a battery BAT voltage is entered into a terminal IN, and a boosted voltage is output from a terminal OUT. The main condenser Cm is charged by the boosted voltage, and an electric charge is accumulated. The charge voltage Vmc of the main condenser Cm is divided by the resistors R1 and R2, and the bleeder voltage is given to the A/D conversion input terminal AD6 of microcomputer 12. Also, the light emission activation circuit 53 receives a feed from the charging voltage Vmc of the main condenser Cm. The output port PO2 of microcomputer 12 is connected to the base of the transistor Qb, and the collector of the transistor Qb is connected to the silicon controlled rectifier SCR gate. A secondary side terminal T2 of the transformer L1 is connected to a trigger terminal of the flash discharge tube 51. The flash discharge tube 51 and the IGBT-Qa are serially connected, in parallel to the condenser Cm.

Figure 7A:
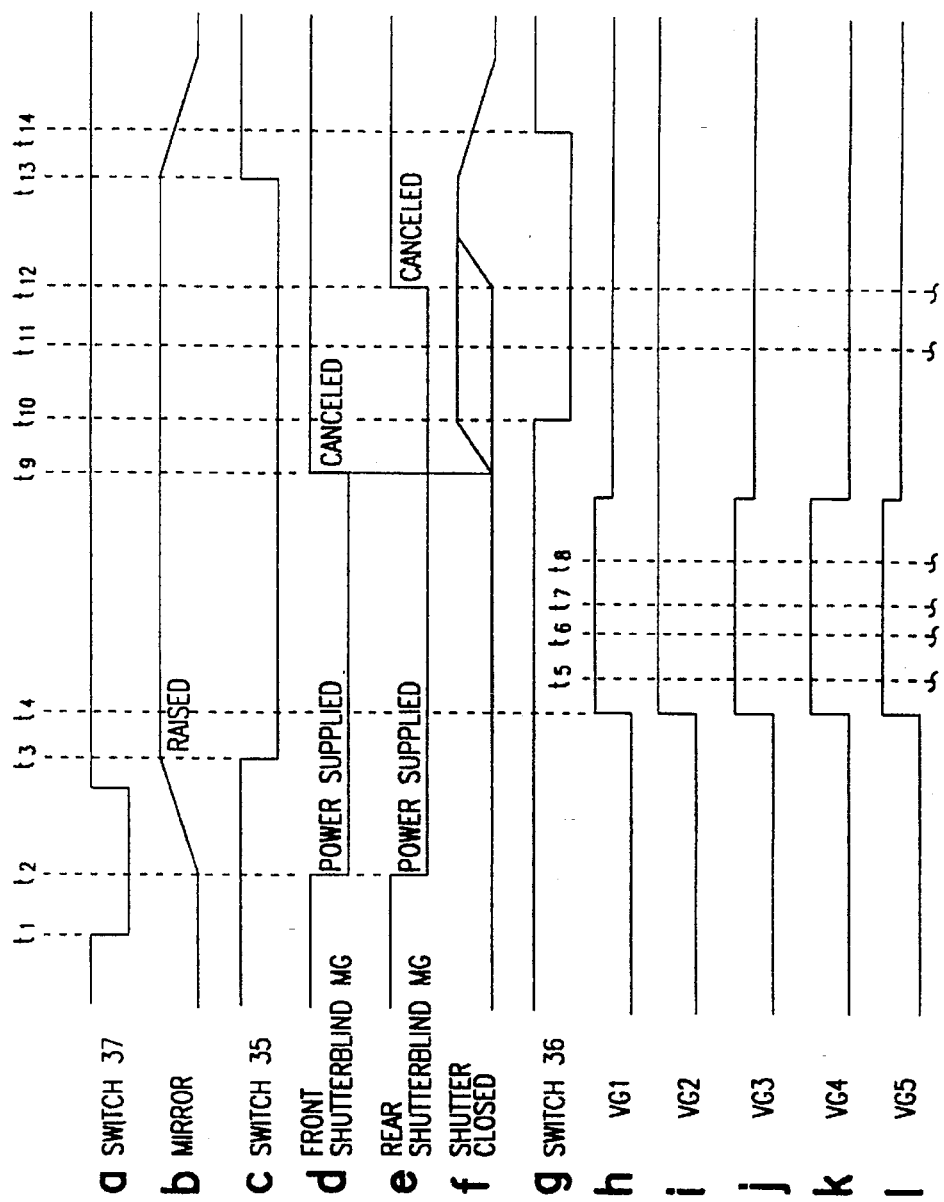
FIG. 7a is a timing chart for explaining the operation of the preferred embodiments of the present invention.
Figure 7B:
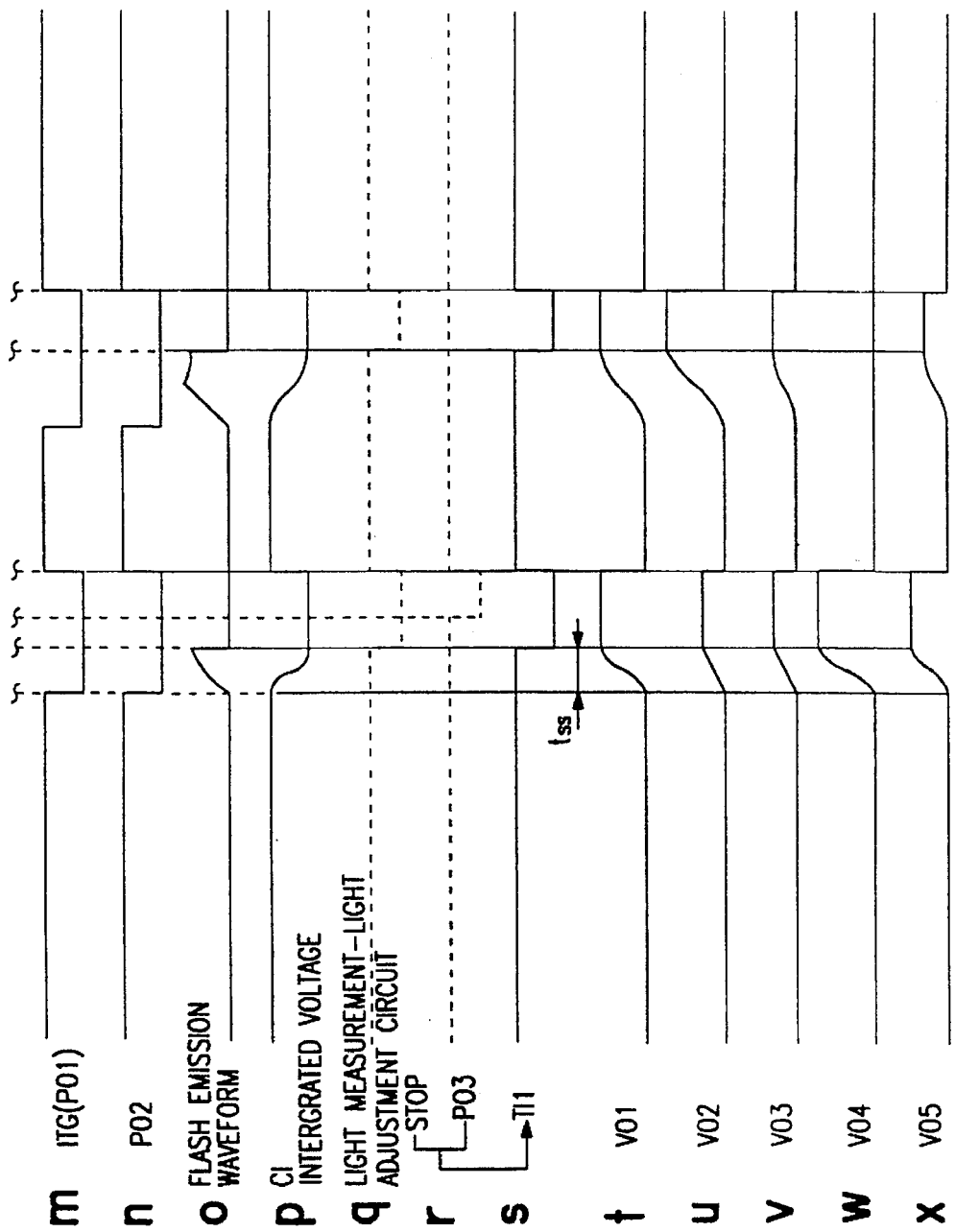
Figure 8:
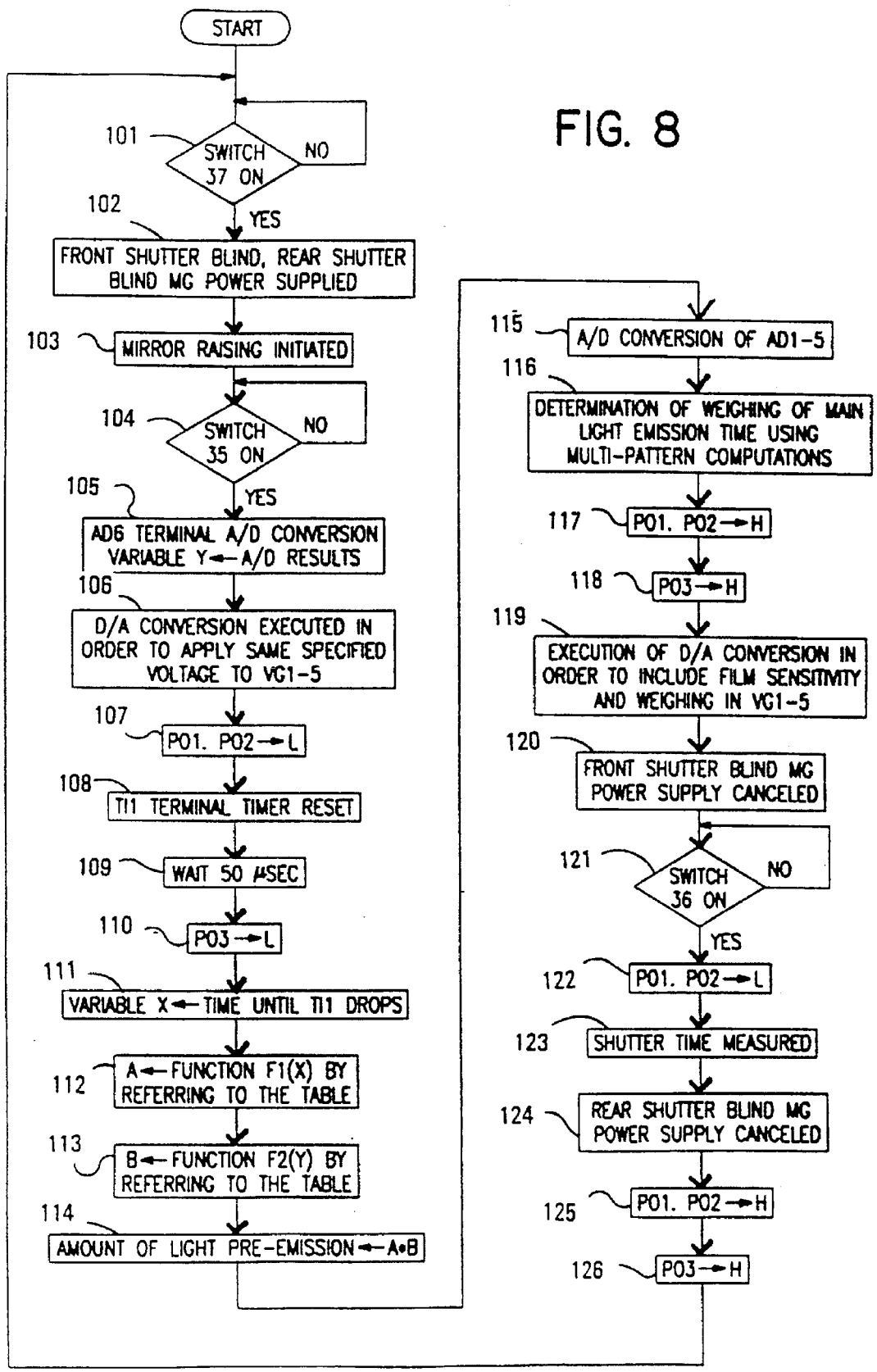
FIG. 8 is a flow chart for explaining the operation of the first preferred embodiment of the present invention.

FIG. 7a is a timing chart for explaining the operation of the first preferred embodiment. FIG. 7b is a continuation of the timing chart of FIG. 7a. FIG. 8 is a flow chart for explaining the operation of the first preferred embodiment of the present invention. When the release activation switch 37 is turned on (at point $t_1$ on waveform a in FIG. 7a), in step 101, the microcomputer 12 initiates a release operation. At the same time, electricity passes to both magnets 31 and 32 of the front shutter blind and rear shutter blind at step 102 (point $t_2$ on waveforms d and e in FIG. 7a). The mirror begins to swing up by action of a drive unit (not shown) in step 103 (point $t_2$ on waveform b in FIG. 7a). Then, the mirror up switch 35 awaits to be turned ON at step 104, and when the mirror up switch 35 is turned ON (point $t_3$ on waveform c in FIG. 7a), a voltage which is input to the terminal AD6, specifically, the voltage which is proportional to the charging voltage Vmc of condenser Cm, undergoes an ND conversion at step 105, and is stored in memory as a variable Y.

In step 106, a D/A conversion is carried out to apply the specified voltage to each of the five gain setting voltage input terminals VG1–VG5 of light measurement-light adjustment circuit 11 (point $t_4$ on waveform h-I in FIG. 7a). In step 107, a command to begin integration is given by dropping the output port PO1 to the "L" level, which should make terminal ITG to the "L" level in relation to light measurement-light adjustment circuit 11 (point $t_5$ on waveform m in FIG. 7b). At the same time, the output port PO2 is dropped to the "L" level (point $t_5$ on waveform m in FIG. 7b).

The signal from the output port PO2, which drops to the "L" level, is taken by the incorporated flash circuit part 50 to be a light pre-emission initiation signal. The silicon controlled rectifier SCR turns conductive and the electric potentials of both sides of trigger condenser Cb, that was charged by the charging voltage Vmc of the main condenser Cm, are instantly converted by a width of charging voltage Vmc. Thus, by the operation of transformer L1, a trigger voltage of several thousand volts is applied to the trigger electrode of the flash discharge tube 51. The discharge current flows through the IGBT-Qa, which is maintained in the "ON" state and the flash is initiated (as shown by the flash emission waveform immediately after point $t_5$ on waveform o in FIG. 7b).

The photodiodes PO11–PO51 of the light measurement-light adjustment circuit 11 capture the light reflected from the subject and output an optoelectric current that is proportional to the amount of captured light. For example, looking at photodiode PO11, the optoelectric current generated by photodiode PO11 is converted to a voltage output that is logarithmically compressed by the OP-amp A11 and the feedback diode D11. The transistors Q11 and Q12 which take this electric potential for the emitter and the electric potential of gain setting input terminal VG1 as the base, and convert the optoelectric current to a current output which is again logarithmically expanded. Consequently, the collector currents of the transistors Q11 and Q12 are amplified by a gain that is determined by the electric potential of VG1, which has maintained a proportional relationship with the optoelectric current, and an output current waveform (that has a shape similar to the light emission waveform o shown in FIG. 7b), is indicated.

The collector current of transistor Q12 is converted to a source current, by a current mirror circuit comprising transistors Q13 and Q14. The source current charges the condenser C11 that is released from the short circuit state by the terminal ITG dropping to the "L" level. The charging voltage of the condenser C11 is converted to a lower impedance voltage output by the buffer amp A12 and is output from the integration voltage output terminal VO1.

The output voltage is raised (as in the waveform immediately after point $t_5$ on waveform t in FIG. 7b), and is integrated with the optoelectric current that has been amplified by a specified gain. The result is expressed in the form of the GND standard voltage. The second and remaining channels operate in a similar manner, except the amount of subject field reflected light varies independently.

Because the gain is fixed by supplying a voltage, in advance, to the gain setting input terminals VG1–VG5, the current, in which the optoelectric current has been amplified by the same gain, flows to transistors Q11–Q51. The condenser C1 is charged with a current which is the sum total of the amplified optoelectric currents of each channel. The terminal voltage of this condenser C1 changes like the waveform of the C1 integration voltage of waveform p in FIG. 7b. When the voltage becomes lower than a standard voltage E2, the comparator CP1 inverts the output, and the STOP terminal turns from the "H" level to the "L" level (point $t_6$ on waveform q in FIG. 7b).

Meanwhile, microcomputer 12 resets the timer for the purpose of measuring the time, from immediately after step 107, until the dropping edge which is to be entered into input port TI1 in step 108. Then, in step 109, the system awaits the passage of 50 μs, using the same timer source. When 50 μs elapses, the output port PO3 turns from the "H" level to the "L" level in step 110 (point $t_6$ on waveform r in FIG. 7b). The signal of the wire connected to input port TI1 drops to the "L" level at the timing of the faster of the timing in which the terminal STOP of the light measurement-light adjustment circuit 11 outputs a "L" level; or the timing at which output port PO3 of microcomputer 12 outputs a "L" level.

While attempting to adjust the flash of the light pre-emission to an optimum detection level, by a light adjustment integration operation, even if there is only a small amount of reflected light, the maximum amount of light emission is restricted such that it does not exceed the specified amount. By this, it is possible to save the discharge energy for the main light emission, while a more effective use is made of the dynamic range when converting the reflected light distribution of the subject field into electronic signals based on the light pre-emission.

A light pre-emission termination signal is given when the input port TI1 drops to the "L" level at point $t_6$, on waveform S in FIG. 7b. Thereafter, the IGBT-Qa, to which the gate terminal is connected in the same line is turned OFF and the flash discharge tube 51 terminates the light emission. The microcomputer 12 measures the time ($t_{ss}$ in FIG. 7b) after the beginning of light emission to when the input port TI1 drops, memorizes the measured time in a specified register, and stores the contents of the specified register in memory as a variable X (in step 111). Then, in step 112, A is set to the function f1 (X), derived by taking the variable X as the argument by referring to a table memorized in ROM. Also, in step 113, B is set to the function f2 (Y), derived by taking the variable Y, which is related to the charging voltage Vcm of main condenser Cm that was previously calculated, as the argument by referring to the table. Then, in step 114, the amount of light pre-emission is calculated by multiplying A×B.

Figure 9:
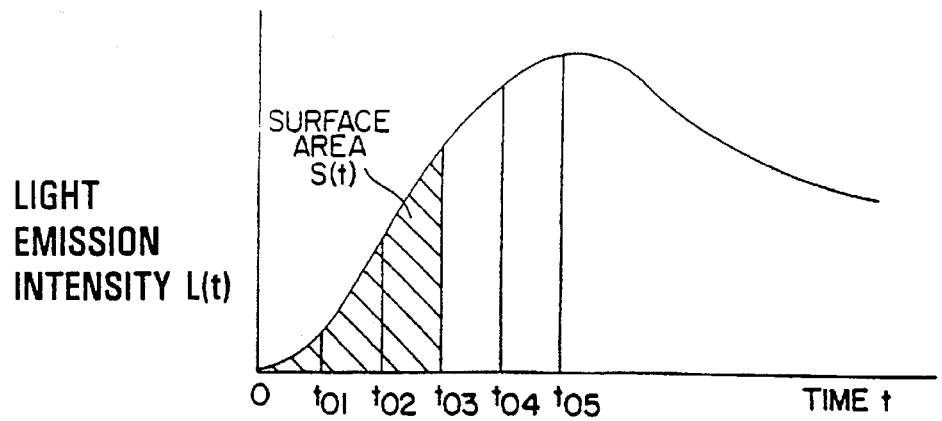
FIG. 9 is a diagram for explaining the principle of detecting an amount of light emission in accordance with the first preferred embodiment of the present invention.
Figure 10:
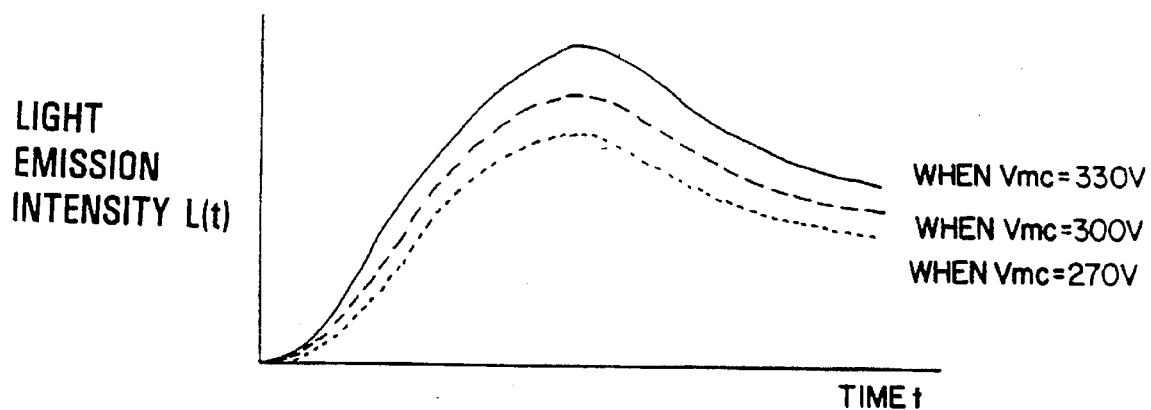
FIG. 10 is a diagram for explaining the principle of detecting an amount of light emission in accordance with the first preferred embodiment of the present invention.

FIGS. 9 and 10 are diagrams for explaining the principal of detecting an amount of light emission in accordance with the first preferred embodiment of the present invention. In FIG. 9, the horizontal axis is the time t, and the vertical axis is the light emission intensity L (t). The curve in FIG. 9 indicates how the light emission intensity changes over time when a flash, that is fully charged by the main condenser, is fully emitted. The form of the curve varies depending on the type of flash discharge tube. Because the kind of flash discharge tube is fixed when installed in the camera, the waveform of that light emission intensity is also fixed. The amount of light emission, namely, the emission energy that is obtained when light emission of the flash discharge tube is terminated during emission, is determined in the following manner. For example, if the light emission is terminated at time $t_{o3}$, the surface area S ($t_{o3}$), marked by hatching in FIG. 9, namely, the surface area of the shape enclosed by the straight line that stands vertically from that time and the curve of the light emission intensity, is proportional to the amount of light emission based on the light emission.

FIG. 10 indicates how the curve, of the time t by the emission intensity L (t), changes depending on the charging voltage of the main condenser. As an example, three curves where Vmc equals 330 V, 300 V, and 270 V, respectively, are shown. The solid line curve of when Vmc =330 V agrees with the curve shown in FIG. 9. In principle, the light emission energy of the flash discharge tube is proportional to the square of the charging voltage of the main condenser. Consequently, the amount of light emission obtained when terminating the light emission, during light emission of the flash discharge tube as described above, is also proportional to the square of the charging voltage of the main condenser.

The method of calculating the amount of light pre-emission shown in FIG. 8 specifically calculates the amount of light emission based on these principles. That is, the function f1 (X) in step 112 defines a value proportional to the surface area S (t), as in FIG. 9. To actually derive this functional value, the value f1 (X), proportional to surface area S (t), for each specified time frame, from this characteristic curve is written in advance into ROM as a data table. The amount of light emission A, when assumed to be first fully charged, is derived by taking the measured light emission time X to be the argument, and then referring to the table.

The function f2 (Y), in step 113, is a function which gives the ratio of the square of Vmc and the square of full charging voltage 330 V in relation to Y. Y is a value proportional to the charging voltage Vmc of the main condenser Cm, as measured prior to the light emission. Specifically, this is a proportion of the light emission energy in relation to full charging. In the microcomputer 12, instead of actually deriving a value by calculations, the f2 (Y), for every specified discrimination of Y, is written in ROM, and the percentage B, in relation to full charging, is derived by taking the measured Y as the argument and referring to the table. Next, the amount of light pre-emission is calculated by multiplying the percentage of the present charging voltage Vmc, in relation to full charging, by the amount of light emission A when fully charged.

Referring once again to FIG. 8, after calculating the amount of light pre-emission in step 114, the voltages of the microcomputer 12 terminals AD1–AD5, which are the integrated voltages in relation to separate regions 93a–93e of the light measurement-light adjustment circuit 11, undergo ND conversion in step 115. The digital results are stored in memory. The memorized digital results become the subject field reflected light distribution information, based solely on the contribution of the flash illumination. The extent of the weighing in relation to the separate regions 93a–93e during the main light emission for the purpose of photography is determined in step 116, by entering the digital results into a specified multi-pattern calculation algorithm. An algorithm as disclosed in Japanese Patent Publication Number Hei 1-203735, may be adopted for this purpose.

When the multi pattern calculations have been completed, the output ports PO1 and PO2 both return to the "H" level in step 117 (point $t_8$ on waveforms m and n in FIG. 7b). The output port PO3 returns to the "H" level in step 118 (point $t_8$ on waveform r in FIG. 7b). In step 119, the gain setting voltages, in relation to each channel, are applied to terminals VG1–VG5 by reflecting the extent of the weighing, in relation to each separate region 93a–93e derived in step 116, and by including the gain adjustment in relation to the film sensitivity. D/A conversion of each of the five channels is performed (point $t_8$ on waveforms h-I in FIG. 7a). By doing this, currents which have a heightened amplification rate are integrated in relation to separate regions which have higher weighing.

Next, in step 120, the electricity to front shutter blind magnet 31 is canceled (point $t_9$ on waveform d in FIG. 7a), which should initiate the actual shutter release operation. By doing this, front shutter blind 87 begins to operate. In step 121, the system awaits synchro switch 36 to go on, after the shutter is fully released. When the synchro switch 36 goes on (point $t_{10}$ on waveform m in FIG. 7b), the output port PO1 immediately drops to the "L" level in step 122 (point $t_{10}$ on waveform m in FIG. 7b). The integration operation of the light measurement-light adjustment circuit 11 is permitted, the output port PO2 also drops to the "L" level (point $t_{10}$ on waveform n in FIG. 7b), and a command is given to the incorporated flash circuit part 50 to begin a main light emission. The flash discharge tube 51 of incorporated flash circuit part 50 launches the light emission (as in the emission waveform shown in FIG. 7b).

The light adjustment operation, based on the light measurement-light adjustment circuit 11, is executed in accordance with the waveforms of the parts from point $t_{10}$ through point $t_{11}$ of FIGS. 7a and 7b. Specifically, in the light measurement-light adjustment circuit 11, the sum total of the expansion currents, that the weighing of transistors Q11–Q51 have added, charges the integration condenser C1. The STOP terminal changes from the "H" level to the "L" level when the sum total becomes lower than the specified standard voltage E2 (point $t_{11}$ on waveform q in FIG. 7q). Thereafter, the IGBT-Qa of the incorporated flash circuit part 50 terminates the light emission of the flash discharge tube 51 (point $t_{11}$ on waveform o in FIG. 7b).

At this time, the exposure, which uses the flash discharge tube 51 as a light source, is concluded. In step 123, the microcomputer 12 measures the time, after the electricity to the front shutter blind magnet 31 is canceled (point $t_9$ on waveform d in FIG. 7a), and at the point in time when the set shutter time has elapsed. Thereafter, the electricity to the rear shutter blind magnet 32 is canceled in step 124 (point $t_{12}$ on waveform e in FIG. 7a). Both terminals of the output ports PO1 and PO2 immediately return to the "H" level in step 125, output port PO3 returns to the "H" level in step 126, and the output ports PO1–PO3 are prepared for the release operation of the next frame. Later, when a shutter charge drive unit (not shown) and a mirror down drive unit (not shown) are driven, the switches related to the sequences at point $t_{14}$ on waveform g of FIG. 7a returns to their original OFF state. The operation during shutter release is concluded, and the system returns to a waiting state for the input of the release switch in step 101.

Although the first embodiment of the present invention has been described with respect to a specific configuration, it will be recognized that the first embodiment is not limited to the specific configuration.

Figure 11:
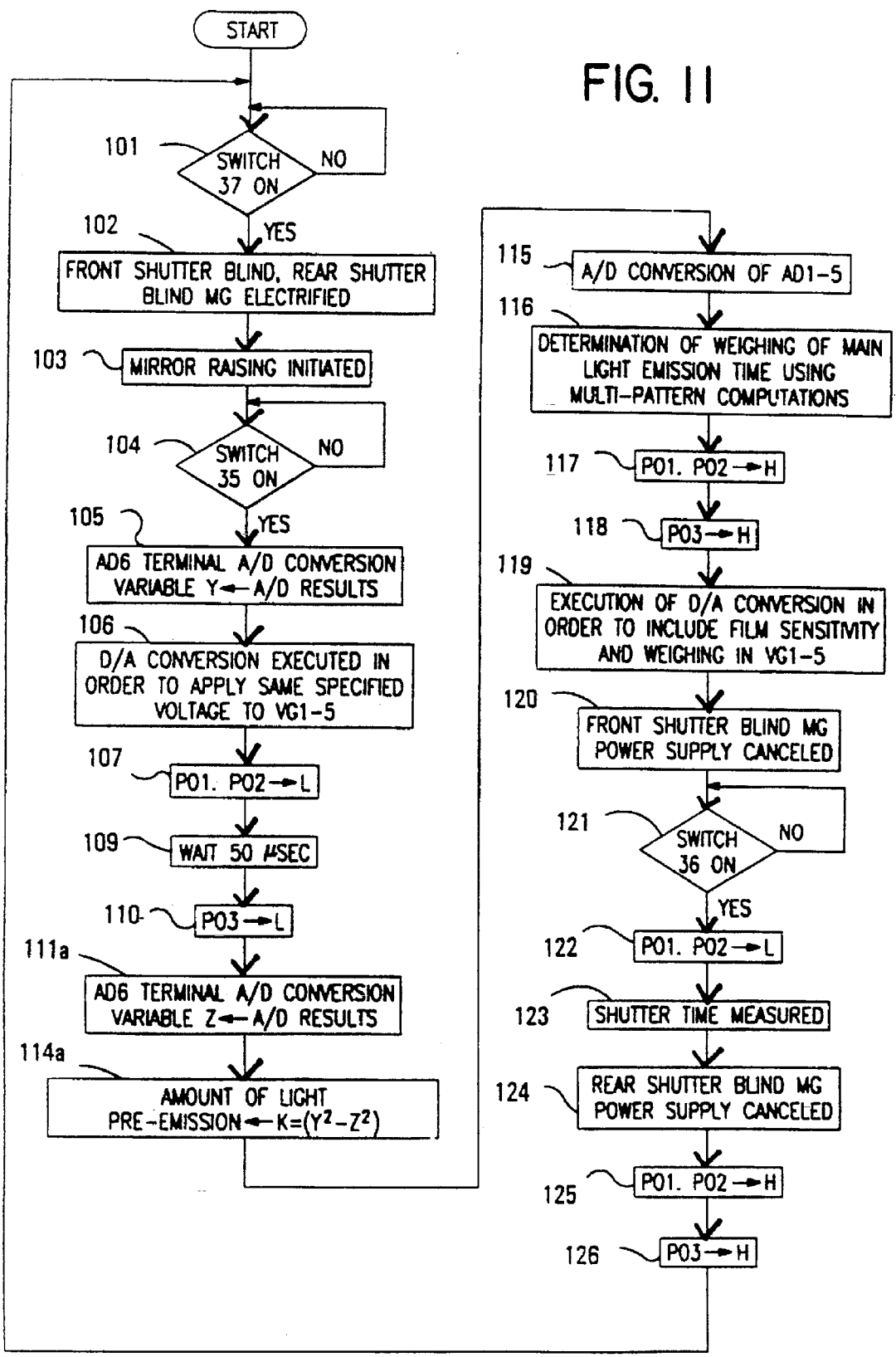
FIG. 11 is a flow chart for explaining the operation of a second preferred embodiment of the present invention.

FIG. 11 is a flow chart explaining the operation of the second preferred embodiment of the present invention as shown in FIG. 1b. The flow of the basic processing is similar to the first embodiment, and the waveforms expressed on each terminal are completely the same as shown in the timing chart of FIGS. 7a and 7b. However, instead of measuring the flash time of the light pre-emission, the charging voltage Vmc of the main condenser Cm is measured after the light pre-emission, and the amount of light pre-emission is calculated by computing and processing the measured value of the voltage after the light pre-emission. Specifically, there is no processing equivalent to steps 108, 111, and 114 as shown in FIG. 8. Instead, in step 111a, which occurs when the light pre-emission flash is completed, the voltage enters into terminal AD6, specifically, the voltage proportional to charging voltage Vmc of main condenser Cm, undergoes ND conversion again, and this digital value is stored in memory as a variable Z. Then in step 114a, the amount of light pre-emission is calculated using equation (1).

$$\text{Amount of light pre-emission} = k \cdot (Y^2 - Z^2) \quad (1)$$

The amount of energy when the flash discharge tube 51 is made to emit is expressed by $h \cdot C \cdot Va^2$, when the condenser capacitance is taken to be C, the charging voltage to be Va, and the coefficient to be h. When the flash discharge tube 51 is made to adjust the light and emit in a serial control form, the remaining amount of energy is conserved, because only the portion consumed by the light emission is subtracted from the energy stored in main condenser Cm. If this remaining voltage is taken to be Vb, the remaining energy at this time is expressed by $h \cdot C \cdot Vb^2$. Consequently, the amount of energy based on this light emission, specifically, the amount of light emission, is expressed by the difference of the stored energy before the light emission and that after the light emission, as in equation (2).

$$\text{Amount of emission energy} = h \cdot C \cdot (Va^2 - Vb^2) \quad (2)$$

Because Y and Z of equation (1) are respectively the results of voltages proportional to Va and Vb of equation (2) having undergone ND conversion, the amount of light emission energy based on the light pre-emission, specifically, the amount of light pre-emission, can be calculated by equation (1) by using constant i and taking to be $Va = i \cdot Y$, $Vb = i \cdot Z$, and further, $k = i \cdot h \cdot C$.

The flow chart of FIG. 11 is completely the same as the flow chart of FIG. 8 from step 115 onward, and TTL multi-light adjustment control is executed using the calculated amount of light pre-emission.

Although the second embodiment of the present invention has been described with respect to a specific configuration, it will be recognized that the second embodiment is not limited to the specific configuration.

Although a few preferred embodiments of the present invention have been shown and described, it would be appreciated by those skilled in the art that changes may be made in these embodiments without departing from the principles and spirit of the invention, the scope of which is defined in the claims and their equivalents. Further, one of ordinary skill in the art will recognize that while preferred embodiments have been shown and described as being used within an optical camera, they may be adapted for use in any device which is desirable to predetermine a needed intensity of a main light emission based on measured results of a pre-emission light, for example, in camcorders, motion pictures, telescopes, binoculars, microscopes, rangefinding equipment, lasers, fiber optic communication systems, various optical projection systems and cd mastering systems.

In accordance with a first aspect of the present invention, it possible to make the light pre-emission a single emission that utilizes a light pre-emission initiation signal and a light pre-emission termination signal that have the same shape as the corresponding signals during the main light emission by calculating the amount of light pre-emission, based on the charging voltage prior to light pre-emission and the time from the initiation of light pre-emission until termination. A compact and low cost multi-light adjustment function can be achieved without providing a special circuit to control the pre-emission. It therefore becomes possible to provide a multi-light adjustment function even in a camera which incorporates a built-in flash. Also, because it is possible to shorten the time required for the light pre-emission by making the light pre-emission a single emission, it becomes possible to shorten the time from the completion of the mirror going up until the front shutter blind is released, thereby increasing the speed of the camera release operation.

In accordance with a second aspect of the present invention, the amount of light pre-emission is calculated based on the difference between the charging voltage prior to light pre-emission and the charging voltage after light pre-emission. It is possible to make the light pre-emission a single emission that uses a light pre-emission initiation signal and a light pre-emission termination signal of the same shape as used during the main light emission. Because it is not necessary to measure the time from the initiation of light pre-emission until termination, both the required hardware and software are simplified.

In accordance with a third aspect of the present invention, the reflected light of the subject field is measured and integrated, and a light pre-emission termination signal is output when the results reaches a specified standard value. Light adjustment control of a single light pre-emission is conducted based on the integrated amount of light reflected from the subject. The timing range, when capturing the reflected light distribution of the subject field based on the light pre-emission as an electronic signal, can be used more effectively.

In accordance with a fourth aspect of the present invention, the reflected light of the subject field is measured and integrated. A first signal is sent when the integration results reach a specified standard value. A second signal is sent when a specified time is measured after sending the light pre-emission initiation signal. The light pre-emission termination signal is output when one of the first signal and the second signal is sent. The light adjustment control of a single light pre-emission is conducted based on the results of having integrated the amount of light reflected from the subject. The amount of the maximum light emission is restricted by the fact that the light pre-emission time is limited to a specified time. Thus, it is possible to reliably maintain discharge energy for the main flash during exposure on the film, while more effectively using the timing range when capturing the reflected light distribution of the subject field as an electronic signal based on the light pre-emission.

What is claimed is:

1. A through-the-lens automatic light adjustment control device comprising:

a voltage increase unit to increase a power source voltage;

a charge accumulation unit charged by the voltage increase unit so as to accumulate an electric charge;

a light emission unit that emits a light pre-emission by discharging the charge accumulated by the charge accumulation unit;

a voltage measurement unit that measures the charged voltage of the charge accumulation unit prior to the light pre-emission;

a light pre-emission initiation control unit which sends the light emission unit a light pre-emission initiation signal to begin the light pre-emission;

a light pre-emission termination control unit which sends the light emission unit a light pre-emission termination signal to terminate the light pre-emission;

a time difference measurement unit which measures the time between the light pre-emission initiation signal and the light pre-emission termination signal; and an amount of light pre-emission determination unit which calculates the amount of light pre-emission based on the charged voltage measured by the voltage measurement unit and the time measured by the time difference measurement unit.

2. A through-the-lens automatic light adjustment control device, as set forth in claim 1, wherein the light pre-emission termination control unit outputs the light pre-emission termination signal when a reflected light of a subject field which is measured and integrated, reaches a specified reference value.

3. A through-the-lens automatic light adjustment control device as set forth in claim 1, wherein the light pre-emission termination control unit comprises:

a first unit which sends a first signal when a reflected light of a subject field which is measured and integrated, reaches a specified reference value;

a second unit which sends out a second signal when a specified time has elapsed after the light pre-emission initiation signal is sent; and a third unit which outputs the light pre-emission termination signal when one of the first signal and the second signal is sent.

4. A through-the-lens automatic light adjustment control device comprising:

a voltage increase unit to increase a power source voltage;

a charge accumulation unit charged by the voltage increase unit so as to accumulate an electric charge;

a light emission unit that emits light pre-emission by discharging the charge accumulated by the charge accumulation unit;

a first voltage measurement unit that measures the voltage of the charge accumulation unit prior to the light pre-emission;

a light pre-emission initiation control unit which sends the light emission unit a light pre-emission initiation signal to begin the light pre-emission;

a light pre-emission termination control unit which sends the light emission unit a light pre-emission termination signal to terminate the light pre-emission;

a second voltage measurement unit that measures the voltage of the charge accumulation unit after the light pre-emission; and an amount of light pre-emission determination unit which calculates the amount of light pre-emission based on the difference between the voltage measured by the first voltage measurement unit and the voltage by the second voltage measurement unit.

5. A through-the-lens automatic light adjustment control device as set forth in claim 4, wherein the light pre-emission termination control unit outputs the light pre-emission termination signal when a reflected light of a subject field which is measured and integrated, reaches a specified reference value.

6. A through-the-lens automatic light adjustment control device as set forth in claim 4 wherein the light pre-emission termination control unit comprises:

a first unit which sends a first signal when a reflected light of a subject field which is measured and integrated, reaches a specified reference value;

a second unit which sends out a second signal when a specified time has elapsed after the light pre-emission initiation signal is sent; and a third unit which outputs the light pre-emission termination signal when one of the first signal and the second signal is sent.

7. A camera comprising:

a main optical lens to focus light fluxes on a focal plane;

a flash unit to emit light;

a shutter extending across the focal plane;

a photoelectric conversion unit adapted to receive light fluxes reflected by said shutter and output a signal indicative of the amount of light received;

a charge accumulation unit to accumulate an electrical charge to provide to said flash unit;

a pre-emission initiation control unit to send a pre-emission initiation signal to said flash unit to initiate a light pre-emission;

a termination control unit to send a pre-emission termination signal to said flash unit to terminate the light pre-emission; and a calculation unit to calculate an amount of light emitted by the light pre-emission based on a voltage of said charge accumulation unit prior to the light pre-emission and a time between the pre-emission initiation signal and the pre-emission termination signal.

8. A camera comprising:

a main optical lens to focus light fluxes on a focal plane;

a flash unit to emit light;

a shutter extending across the focal plane;

a photoelectric conversion unit adapted to receive light fluxes reflected by said shutter and output a signal indicative of the amount of light received;

a charge accumulation unit to accumulate an electrical charge to provide to said flash unit;

a pre-emission initiation control unit to send a pre-emission initiation signal to said flash unit to initiate a light pre-emission;

a termination control unit to send a pre-emission termination signal to said flash unit to terminate the light pre-emission; and a calculation unit to calculate an amount of light emitted by the light pre-emission based on a voltage of said charge accumulation unit prior to the light pre-emission and a voltage of said charge accumulation unit after the light pre-emission.

9. A method of performing light adjustment control for a flash comprising:

initiating a pre-emission flash;

measuring a voltage of a charge accumulation unit used to emit the pre-emission flash prior to the initiation of the pre-emission flash;

terminating the pre-emission flash when a quantity of detected reflected light reaches a preset value;

measuring a time between initiating and terminating the pre-emission flash; and calculating the amount of light emitted by the pre-emission flash based on the measured voltage and time.

10. A method as set forth in claim 9, wherein the quantity of detected reflected light is measured by integrating an output signal of a photoelectric convertor.

11. A method as set forth in claim 9, wherein the step of terminating the pre-emission flash comprises:

terminating the pre-emission flash upon the occurrence of one of the quantity of detected reflected light reaches a preset value and a predetermined amount of time elapses after initiating the pre-emission flash.

12. A method of performing light adjustment control for a flash comprising:

initiating a pre-emission flash;

measuring a first voltage of a charge accumulation unit used to emit the pre-emission flash prior to the initiation of the pre-emission flash;

terminating the pre-emission flash when a quantity of detected reflected light reaches a preset value;

measuring a second voltage of the charge accumulation unit after terminating the pre-emission flash; and calculating the amount of light emitted by the pre-emission flash based on difference between the first and second voltages.

13. A method as set forth in claim 12, wherein the quantity of detected reflected light is measured by integrating an output signal of a photoelectric converter.

14. A method as set forth in claim 12, wherein the step of terminating the pre-emission flash comprises:

terminating the pre-emission flash upon the occurrence of one of the quantity of detected reflected light reaches a preset value and a predetermined amount of time elapses after initiating the pre-emission flash.

* * * * *